Aug. 4, 1959 E. W. BLACK ET AL 2,897,776

DUSTER

Filed July 1, 1957

EMERSON W. BLACK,
ZIBA A. FERREL,
INVENTORS.

BY Calvin Brown
ATTORNEY.

United States Patent Office 2,897,776

Patented Aug. 4, 1959

1

2,897,776

DUSTER

Emerson W. Black and Ziba Alvin Ferrel, Los Angeles, Calif.

Application July 1, 1957, Serial No. 669,272

1 Claim. (Cl. 118—13)

The present invention relates to a machine for dusting or powdering various food products, such as chicken, meat or vegetables, by way of example, and which machine is adaptable for commercial as well as household use.

The invention has for an object the provision of a duster which quickly and efficiently coats an edible article with flour or other material, which is sanitary and which is generally superior to dusters now known to the inventors.

A further object is the provision of a duster which is completely enclosed, to the end that the product to be dusted as well as the dusting material is maintained clean and against contamination from outside sources.

A further object is the provision of a duster for food products so constructed and arranged as to permit unused dusting material, such as flour, to be retrieved, to the end that wastage of such material is prevented. With reference to the foregoing object, the usual method of dusting a cut-up chicken is to place the chicken parts within a bag containing loose flour or other material, which has been seasoned. Manipulation of the bag supposedly coats the parts of chicken, but it is a known fact that the dusting is uneven and, as a rule, after a dusting, the remaining flour is generally thrown away. The present invention overcomes this wastage and, at the same time, dusts the meat product or chicken evenly and efficiently, so that all portions of the chicken or meat products are covered evenly.

A further object is a duster wherein meat, chicken or other food products may be dusted with a minimum of actual handling of the said product.

A further object is the provision of a duster for food products wherein the dusting is accomplished without injury to the food product during the dusting operation.

With the above mentioned and other objects in view, the invention consists in the novel and useful provision, formation, construction, association, and relative arrangement of parts, members, and features, all as shown in one embodiment in the accompanying drawing, described generally, and more particularly pointed out in the claim.

Figure 1:
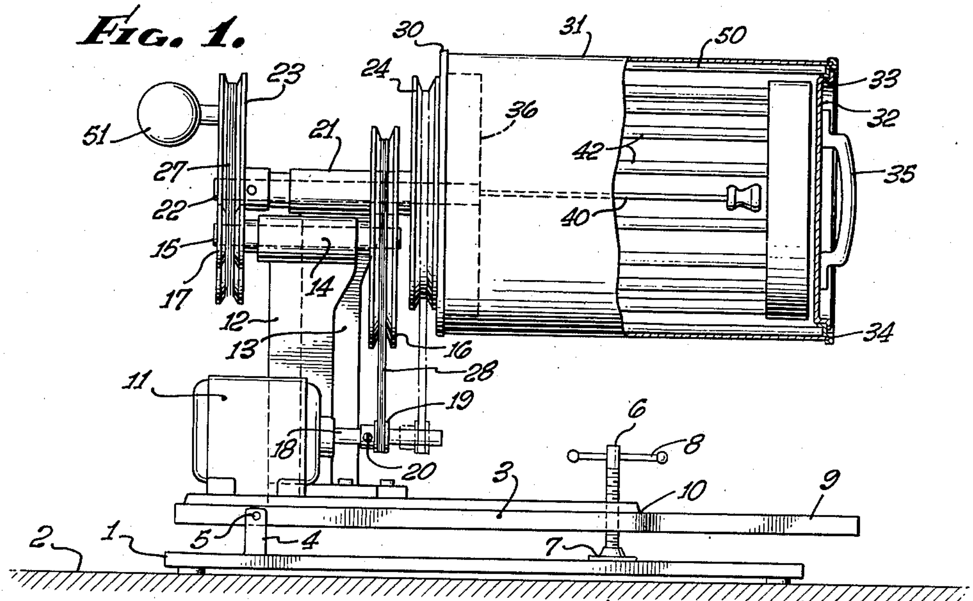
Figure 1 is a fragmentary side elevation of the duster.

Referring now to the drawing, we have provided a platform 1, preferably having four spaced apart rubber feet so that the said platform may rest upon some foundation member or supporting surface, such as shown at 2, and a sub-platform 3 mounted above platform 1 by means of a pair of aligned standards 4, one of which is shown in Figure 1, the other standard being of identical form and oppositely positioned, the said standards 4 being secured fixedly to the platform 1 and pinned, as shown at 5, to opposite sides of the platform 3. This allows the platform 3 to be tilted on the said pins. To control plat-

Figure 2:
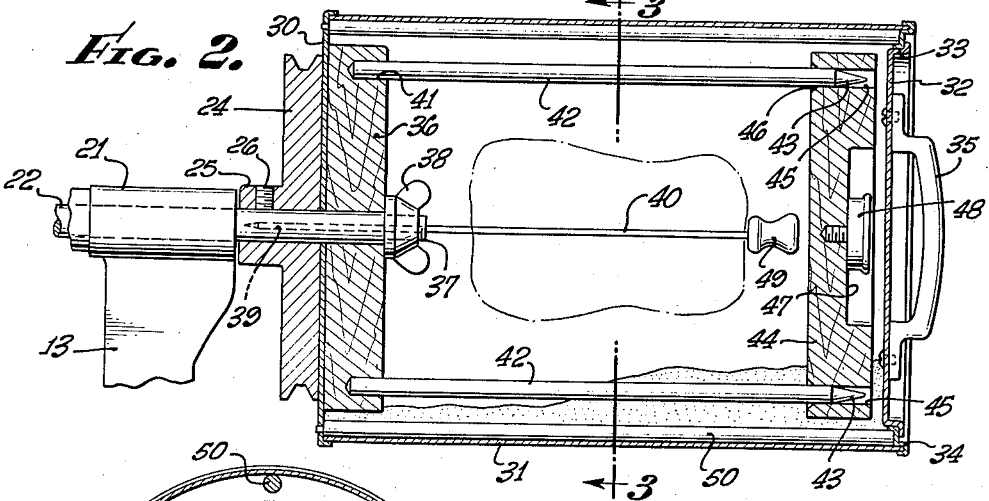
Figure 2 is a vertical sectional view, on an enlarged scale, of the duster drum, and, Figure 3 is a sectional view on the line 3—3 of Figure 2.
Figure 3:
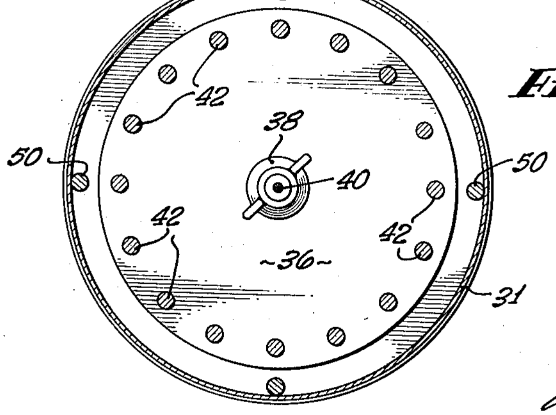

2 form elevation or tilt, we have provided a screw 6, one end of which is swiveled in member 7, which member 7 is secured to platform 1, and the said screw is passed through a threaded bore in the platform 3, the screw being turned by means of an arm 8. Thus, the platform 3 may be leveled with respect to platform 1 by merely turning the screw 6, or the platform 3 may be swung on the pins 5, as hereinafter set forth. Platform 3 is provided with a handle 9 medially extending from the rear edge 10 of the platform. Mounted on the platform 3, and preferably over the pins 5, is a motor 11, and a pair of standards or pedestals 12 and 13. These standards may or may not be directly over the pins 5. Standard 12 is provided with a bearing 14 through which a shaft 15 is passed. One end of said shaft carries a pulley 16 and the opposite end carries pulley 17. It will be noted that there is a difference between the diameters of the said pulleys. The motor shaft 18 carries a pulley 19 which is adjustable on said shaft by means of a set screw 20. Standard 13 is provided with a bearing 21 through which a shaft 22 is passed, the outer end of said shaft 22 carrying a pulley 23, the groove of which is in juxta-position and alignment with the groove of pulley 17. Likewise secured to said shaft 22 is a pulley 24, the hub 25 of which is provided with a set screw 26 for locking the said hub to the shaft 22. A continuous belt 27 is received in the grooves of pulleys 17 and 23 and a continuous belt 28 extends between the grooves of pulleys 16 and 19. If desired, the pulley 19 may be shifted to the dotted line position on shaft 18 whereby a continuous belt may be run between pulleys 19 and 24 for direct driving of a drum member. The drum member includes a base or end member 30, and a cylindrical side member 31 joined to said base in any appropriate manner, such as by flanging the base 30 and securing the flange to the said cylindrical member, and a removable cover member 32, preferably formed to fit within the drum, as shown in Figure 2. This may be accomplished by providing the cover with an annularly flanged portion 33 engaging an annular fitting 34, which is seamed to the cylindrical member 31 at the outer end thereof. For easy manipulation of the cover, a handle 35 is provided. An annular block 36 is carried upon the shaft 22, the said shaft being passed through the base 30 of the drum and within said drum, terminating in a screw-threaded portion 37 adapted to receive a wing nut 38 which bears against one surface of the base 30, the outer surface of said base engaging a flat outer face of the pulley 24, as shown in Figure 2. Shaft 22 is likewise provided with an axial bore 39, which bore is adapted to receive an end of a spit 40 for holding the spit centrally of the drum.

The annular block 36 is provided with an annular series of bores, designated generally as 41, which are transverse of the said block and extend inwardly from the inner surface of the block, the said bores being adjacent the rim of the said block. These bores are adapted to receive elongated rods 42 and to so hold said rods as to provide a cage. Preferably, the said rods are frictionally secured within the bores 41 of block 36 and said rods are pointed at their outer ends, as shown at 43. A further block 44 having the same diameter as block 36 is provided with an annular series of transverse bores 45 matching in spacing and position the bores 41. The bores 43 are counter-sunk adjacent the inner face of block 44, as shown at 46. The outer face of block 44 is provided with a central circular depression 47 within which is a knob 48. As shown in Figures 1 and 2, the spit 40 has a handle 49 which is adjacent the inner surface of block 44. When the cover 32 has been removed from the drum, the block 44 may be removed from the rods 42 by pulling upon the knob 48.

Positioned adjacent the inner surface of the cylindrical side member 31, and secured to the base 30 and annular fitting 34 are a plurality of spaced apart parallel risers 50. In the present instance, four risers situated 90° apart are utilized, although any number may be employed, and said risers take the form, in the present instance, of rods quite similar to the rods 42.

The operation, uses and advantages of the invention just described are as follows:

Having removed the cover 32, block 44 and spit 40, dusting material, such as flour, may be placed within the drum, the platform 3 being tilted upwardly by the hand grasping the handle 9 and holding the platform at any desired inclination relative to platform 1. The construction is such that the platform 3 may be at a 90° angle relationship to platform 1, if so desired. This makes it a simple matter to pour flour or other seasoned material into the drum. If a chicken or chickens are to be dusted, the spit 40 impales the chicken meat and the sharpened end of the spit is reinserted within the bore 39 of shaft 22, whereupon block 44 is inserted within the drum, the sharpened ends of rods 42 entering the holes 45, followed by replacement of the cover. Upon energizing the motor 11 or, in the absence of energizing motor 11, a turning of the pulley 23 by means of the hand knob 51 secured to said pulley, the drum is rotated which, of course, will rotate the shaft 22 and the spit 40. During this rotation, the flour which contacts the inner surface of the cylindrical member 31 is lifted upwardly by the flights 50 and drops between the rods 42 of the cage onto the chicken pieces carried on the spit 40. Preferably, the rotation is reasonably slow, perhaps 60 r.p.m.

In the case of the dusting of other edibles, such as, for instance, a steak, the steak may be placed within the cage, which is formed by the rods 42, with the result that the steak is elevated as the cage turns with the drum with the dusting material falling thereon under gravity and tumbling action.

As shown in Figure 1, pulley 24 may be directly driven by pulley 19 on the shaft of the motor 18, all dependent on the speed with which it is desired to rotate the drum, or if a greater degree of differential in rotation is desired, it is evident that the motor 11 may be utilized to drive between pulleys 16 and 19 and, in turn, pulleys 17 and 23. As is obvious, any desired speed of revolution of drum may be accomplished by varying pulley diameters. In place of using pulleys, we may employ a variable speed gear box.

We have found it expedient to use wooden rods 42, preferably formed from maple, as maple is tasteless and is not affected by boiling water. It is evident, for instance, that all parts within the drum may be readily removed for sterilization and, further, that all food products may be readily removed from the drum by simply tipping the drum without the necessity of touching the food by hand. It is also evident that the size of the machine will vary, depending upon its use, and service, and whether for home use or for commercial adaptation.

We claim:

A duster as disclosed, including an imperforate drum having a base closing one end thereof and a removable cover for closing the opposite end, an annular block within said drum and engaging the base, a shaft passed through said base of said annular block, means for securing the block, shaft, and base in working relationship for simultaneous turning movement when the shaft is rotated, said annular block provided with bores adapted to receive one end of elongated rods extending parallel to the drum axis, in spaced relationship, and a block provided with an annular series of transverse bores for receiving the other end of said rods, defining a cage, elongated flight members secured to the inner surface of the drum and spaced from the cage for lifting dusting material within the drum and dropping the same during drum rotation, said shaft provided with an axial bore and a spit extending axially of said drum and detachably received within said axial bore.

References Cited in the file of this patent

UNITED STATES PATENTS

| | | |
|---|---|---|
| 2,450,661 | Herrmann | Oct. 5, 1948 |
| 2,506,185 | White | May 2, 1950 |
| 2,577,433 | Robb | Dec. 4, 1951 |
| 2,638,071 | Otken | May 12, 1953 |